United States Patent
Schlüter et al.

[11] Patent Number: 6,114,651
[45] Date of Patent: Sep. 5, 2000

[54] LASER BEAM APPARATUS AND WORKPIECE MACHINING PROCESS

[75] Inventors: Holger Schlüter, Stuttgart; Axel Zwick, Aachen; Konrad Wissenbach, Herzogenrath; Edwin Büchter; Frank Reichel, both of Aachen, all of Germany; Winfried Barkhausen, CL Vaals, Netherlands

[73] Assignee: Frauenhofer Society for the Promotion of Applied Research, Munich, Germany

[21] Appl. No.: 08/980,089

[22] PCT Filed: May 30, 1996

[86] PCT No.: PCT/DE96/00941

§ 371 Date: Nov. 26, 1997

§ 102(e) Date: Nov. 26, 1997

[87] PCT Pub. No.: WO96/38257

PCT Pub. Date: Dec. 5, 1996

[30] Foreign Application Priority Data

May 30, 1995 [DE] Germany ............................ 195 19 150

[51] Int. Cl.[7] .................................................. B23K 26/36
[52] U.S. Cl. ............................... 219/121.69; 219/121.68; 219/121.8
[58] Field of Search .......................... 219/121.6, 121.78, 219/121.67, 121.68, 121.61, 121.69, 121.79, 121.8, 121.73, 121.74; 134/1

[56] References Cited

U.S. PATENT DOCUMENTS

| | | | |
|---|---|---|---|
| 3,392,259 | 7/1968 | Meier | 219/121.6 |
| 3,622,743 | 11/1971 | Muncheryan | 219/121.68 |
| 4,368,080 | 1/1983 | Langen et al. | 219/121.85 |
| 4,673,795 | 6/1987 | Ortiz, Jr. | 219/121.6 |
| 4,720,621 | 1/1988 | Langen | 219/121.6 |
| 4,855,565 | 8/1989 | Thomas et al. | 219/121.79 |
| 4,945,489 | 7/1990 | Vahab | 364/505 |
| 5,268,554 | 12/1993 | Ream | 219/121.8 |
| 5,298,717 | 3/1994 | De Rossett, Jr. | 219/121.68 |
| 5,643,472 | 7/1997 | Engelsberg et al. | 219/121.69 |

FOREIGN PATENT DOCUMENTS

| | | |
|---|---|---|
| 0102732 | 3/1984 | European Pat. Off. . |
| 0189027 | 7/1986 | European Pat. Off. . |
| 0213471 | 3/1987 | European Pat. Off. . |
| 2418064 | 10/1975 | Germany . |
| 2943107 | 5/1981 | Germany . |
| 3029104 | 2/1982 | Germany . |
| 3906336 | 8/1990 | Germany . |
| 4005453 | 8/1991 | Germany . |
| 4006622 | 9/1991 | Germany . |
| 4212391 | 10/1993 | Germany ............................ 219/121.6 |
| 63-41090 | 2/1988 | Japan . |
| 95/35575 | 12/1995 | WIPO . |

*Primary Examiner*—Geoffrey S. Evans
*Attorney, Agent, or Firm*—Pandiscio & Pandiscio

[57] ABSTRACT

A laser beam apparatus for the removal of surface layers from work pieces with a beam-emitting head that may be guided by hand and that is equipped with focusing optics, which is connected to laser apparatus that generates a laser beam so as to admit light, which exhibits a beam-deflecting direction that moves on a pre-determined pathway in an oscillating manner, which covers the laser beam radially with a point and releases it through an emission opening that faces the work piece, and which has a distance retainer that permits the adjustment of the distance of the beam-emitting head from the work piece. In order to achieve the possibility of its use under freehand guidance with great mean power outputs in the course of which acceptable area coverage rates, or rather processing times are to be rendered possible, the laser beam apparatus is embodied in such a way that the distance retainer is the point of the beam-emitting head that covers the laser beam radially, that the laser beam may be oscillated by the beam deflection apparatus on a pre-determined pathway by means of an exit opening of the distance retainer that has been adapted to the pathway, and that the focusing optics can alter the focusing of the laser beam depending upon the beam deflection in the sense of a focus that lies on the surface of the work piece.

37 Claims, 2 Drawing Sheets

LASER BEAM APPARATUS AND WORKPIECE MACHINING PROCESS

The invention relates to a laser beam apparatus for the removal of surface layers from work pieces with a beam-emitting head that is equipped with focusing optics and is capable of being guided by hand, which is connected to a laser apparatus that produces a laser beam so as to feed in light, which exhibits a direction of beam deflection that covers the laser beam laterally with a point and releases it through an exit opening on the side facing the work piece, and which has a distance retainer that renders it possible to adjust the distance of the beam-emitting head from the work piece.

A laser beam apparatus having the aforementioned features is known from the German patent document DE-C-29 43 107. The distance retainer is a frame that is present laterally from the beam-emitting head. The beam-emitting head has a point that covers the laser beam radially that is arranged at a distance from the work piece and has an exit opening. The exit opening is sufficiently large that the laser beam can oscillate on a pre-determined pathway. A focusing of the laser beam onto the surface of the work piece is not provided. The laser beam apparatus is designed for use with a $CO_2$ laser.

Beyond that, it is known, from the United States patent application U.S. Pat. No. 3,622,743, how to use a miniaturized laser beam apparatus of low output on paper for the removal of printed letters. Laser radiation is turned on only if the point of the known apparatus is pressed on and a micro-switch is closed. Due to the oblique positioning, which is possible at all times, the point permits no sealing off at the work piece being processed, so that a removal of surface layers with greater laser power outputs is not admissible, because then greater endangerment of the operator and the environment would be present.

The realization of high mean power outputs is lacking in all mobile laser systems that are available at the present time. The high mean outputs that can be realized with the customary technology, even in a mobile and robust fashion, are, however, urgently needed in order to render acceptable surface coverage rates and processing times possible. Only in this way can a broad, especially industrial, distribution of the apparatus be accomplished.

By comparison, it is the underlying task of the invention to improve upon a laser beam apparatus having the characteristics mentioned at the outset in such a way that it can be used in conjunction with freehand guidance with great mean power outputs such that acceptable surface coverage rates or rather, processing times should be rendered possible.

This task is resolved by virtue of the fact that the distance retainer is the point of the beam-emitting head that covers the laser beam laterally, which may be supported on the work piece so as to effect a seal, that the distance retainer is the point of the beam-emitting head, which covers the laser beam over laterally, which may be supported on the work piece so as to effect a seal, that the laser beam is oscillatible by the beam deflection apparatus on a predetermined pathway by means of an exit opening of the distance retainer that is adapted to the pathway, and that the focusing optics can alter the focus of the laser beam in dependence of the beam deflection in the sense of a focus lying on the surface of the work piece.

For the laser beam apparatus, it is significant that it exhibits a distance retainer that may make contact with the work piece. The distance retainer guarantees a distance of the beam-emitting head from the work piece that can be predetermined, at the least, however, a predetermined minimum distance, so that the power output made available by the laser apparatus is brought to bear in an area of the surface of the work piece, the size of which is predetermined as well, particularly by the beam deflection apparatus. Predetermined intensity values can be adhered to with a sufficient degree of precision while utilizing the distance retainer. The laser beam apparatus can be used for various processing methods. The removal of surface layers from work pieces and the processing of surfaces of work pieces are just as possible as are separation, joining, and drilling. In the process, the distance retainer can be embodied so as to meet the requirements of the individual purposes of intended use, without having to change optical parts of the beam-emitting head. Therefore, commercially available lasers, which need not be specially designed for outside use, may be considered for use as the laser apparatus. The transporting of work pieces can be reduced, due to the fact that the hand guided beam-emitting head can be used on large production areas without moving the laser apparatus.

The beam deflection apparatus, which moves the beam, is of particular advantage for the economical processing of larger areas using small beam points. The beam deflection apparatus moves the laser beam, proceeding from the beam-emitting head, and relative to the work piece. The beam-emitting head, which is guided freehand, or a beam-emitting head that is guided by a control unit can work over large areas, even with a small beam spot, whereby high levels of intensity are brought to bear at great mean outputs of power; in each case, these are adapted to the work piece to be processed in such a way, indeed, that the processing procedure is optimized. In this process, the beam deflection apparatus can be adapted to the individual purposes of use accordingly. For example, it is shut down in the case of drilling, or a particularly sharply-focused laser beam is moved on the drilling surface, in the form of a circle, for example. In the process, the guidance of the beam-deflection apparatus can, for purposes of optimizing the working process, be embodied in such a way that the laser beam works upon work piece-specific areas as well, such as circular areas, or triangular areas, for example. These areas to be processed are no larger than necessary, so that the time of utilization is optimized.

The nature of the impingement of the distance retainer to assure the requisite distance of the beam-emitting head from the surface of the work piece is influenced, in the first instance, by the requirements, with respect to precision, that are placed upon the mounting that maintains distance. In principle, it is possible to provide for a contact-free distance-maintaining mounting. Such a distance retainer may be considered, to be sure, only if the precision of adjustment lies within a range that can be adhered to by guiding the beam-emitting head by hand. That is conceivable in those instances of application, for example, that do not require any exact position of focus, thus, in those applications, in which it is of no consequence that the area of focus that assures a pre-determined intensity of the laser beam precisely on the surface of the work piece to be processed is provided. In a majority of instances of use, and particularly when working quickly with the beam-emitting head, or at high productivity, it will be advantageous, however, to place the focus precisely upon the surface of the work piece. That can be achieved in a simple manner by virtue of the fact that the distance retainer may be supported on the same side as the work piece. By being supported on the work piece, the beam-emitting head is held with sufficient precision at the distance from the work piece that is predetermined by the length of the distance retainer. In the simplest instance of its embodiment, the distance retainer can be a pin that is supported on the surface of the work piece.

In the case of laser beam apparatuses with a hand-guided beam-emitting head, it is important to take sufficient measures to protect the user. In this spirit, the laser beam apparatus can be embodied in such a way that the distance retainer laterally covers the laser beam that is emitted between the work piece and the beam-emitting head practically completely. The distance retainer also functions here as protection against contact. It is impossible for the hand, or other objects, to enter the shielded area of irradiation. A process control can also be used to minimize the requisite processing time.

The wide array of conceivable instances of utilization of the laser beam apparatus necessitates the use of various distance retainers. It is therefore to good purpose to embody the laser beam apparatus in such a manner that the distance retainer is attached to the beam-emitting head so as to be interchangeable, and/or, that the focusing optics be connected to the beam-emitting head so as to be interchangeable. The structural solution for the interchangeable attachment of the distance retainer on the beam-emitting head can be adapted to the conditions under which the change is effected. For frequent changes, for example, a bayonet-type embodiment of the distance retainer and the beam-emitting head in the coupling area is possible. The focusing optics may be embodied accordingly as well, if the latter are connected to the beam-emitting head so as to be interchangeable. By means of various interchangeable lenses, the laser beam apparatus can be readily adapted to various focal lengths, or to surfaces to be processed that have varying degrees of curvature.

A structural extension of the laser beam apparatus is distinguished by the fact that the distance retainer exhibits sealing agents and/or friction-reducing agents on the side facing the work piece, which work, if necessary, in conjunction with an increment transmitter that is connected to a control device of the laser apparatus for controlling operational parameters, as well as for controlling laser output in the sense of identical output per unit of area. The sealing agents are used if the distance retainer surrounds the laser beam on all sides. The screening of the beam that occurs as a result is supplemented by the seal. No laser beam can escape from the enclosed space within the distance retainer. In addition, the seal can also serve the purpose of preventing gases and vapors that arise in the course of processing from escaping to the outside, where they could be harmful to personnel or property. At the same time, as a result of the sealing, a re-oxidation of metallic surfaces can be reduced. Consideration may be given to the use of rubber lips, for example, as sealing agents, or objects made of teflon that are intended to be applied, or applications made of fiber-reinforced teflon, whose material is sufficiently resistant to heat and to the gases and vapors that arise in the course of the process. Rollers or balls are examples of friction-reducing agents. If such rollers work in conjunction with an increment transmitter, the increments can be used to control a regulating apparatus with which the operational parameters of the laser apparatus can be adapted to guidance by hand, or to mechanical guidance as well. In the event that only few increments are emitted per unit of time, the laser power output is decreased. Conversely, in the case of numerous increments per unit of time, the laser power output is increased. In this way, the same energy per unit of area is applied to every area of the surface of the work piece, even if the rate of movement of the beam-emitting head is not uniform as a result of being guided by hand. A uniform removal and diminished thermal loading of the surface occur.

The distance retainers can be used in a wide array of embodiments. In particular, they must be of varying lengths in case varying focal lengths are to be used. However, they must also be adapted to the size of the beam's spot. It is therefore advantageous to embody the laser beam apparatus in such a way that the distance retainer can be adjusted with respect to length, and/or it is embodied in various cross-section configurations. A distance retainer whose length may be adjusted, consists, for example, of parts of varying lengths, or of parts that are connected to one another in various positions, e.g. by way of rests, to achieve various distances, so that in each case, the terminal areas that lie outside the zone of connection exhibit varying distances relative to one another. With the aid of the various configurations of the cross-sections of the distance retainers, consideration can be given to movements of the laser beam within the distance retainer, for example, to slewing motions of lesser or greater magnitude for the purpose of scanning the laser beam. The more remote the parts of the distance retainer that delimit the laser beam's range of slew, especially from the mean position of the beam, the fewer processing tracks need be laid next to one another to process a pre-determined area. By contrast, the smaller the opening of a distance retainer that surrounds the laser beam on the side facing the work piece is, the greater the curvature of the surface that is being worked upon can be. The distance retainer then lends itself more favorably to complex work piece geometrical configurations. The wide array of space retainers that is necessary to be able to react in a flexible manner to the various geometrical configurations of the work pieces is acceptable, however, because an optimal treatment result can be achieved with them in the shortest time.

In the sense described previously, it is also advantageous to embody the laser beam apparatus in such a manner that the exit opening for the laser beam is adapted to the shape of its beam spot or the cross-section of the beam respectively, and, if necessary, it has an additional open area for observing the surface of the work piece. The result is minimal external dimensions of a distance retainer that covers the laser beam laterally practically completely. The exit opening of the distance retainer can be embodied so that all pathway areas that are provided can be struck by the laser beam. However, it is also possible to adapt the exit opening to a special pathway area, for example, to a linear pathway area, on which the laser beam is moved back and forth. The distance retainer is then more easily manageable on the side facing the work piece. If such a distance retainer is equipped, in addition, with an open area for observing the surface of the work piece, the laser beam apparatus can be operated with a diagnostic or controlling apparatus, which, in order to be effective, must have the possibility of observing the surface of the work piece.

The laser beam apparatus can be embodied in an extended manner such that the distance retainer has a hollow structure with a thin wall in the form of a truncated cone, a pyramid, or a regular cylinder, which is adapted to the area of movement of the laser beam, which is movable relative to the distance retainer. The hollow structure in the form of a truncated cone is particularly well-suited to a conically tapering laser beam, and it can be embodied in such a manner that the structural spatial expenditure of the distance retainer remains small. The pyramidal hollow structure, whose exit opening in the case of a laser beam that moves back and forth is slit-like or rectangular in shape, lends itself particularly well to a back- and forward-moving guidance of the laser beam. The regularly cylindrical hollow structure is used if the laser beam is guided on circular pathways, so that for that reason, the outlet opening must be correspondingly circular in shape.

In order to obtain an optimal working outcome, particularly in the case of constantly recurring, identical processing tasks, the laser beam apparatus can be so embodied that the distance retainer, on the side facing the work piece, is adapted to a contour of the work piece, if necessary, with a point that is rendered oblique in the area of an outlet opening. When removing layers and cleaning a work piece of surface layers or coatings, the rate of removal and the uniformity of removal can be optimized. The adaptation of the distance retainer to the circular cross-section of a pipe on which the laser beam apparatus is moved in the longitudinal direction, in which the distance retainer, which has been adapted to the circular cross-section, simultaneously causes an oblique guidance of the applied beam-emitting head, may be cited as an example.

A further extension of the laser beam apparatus may be seen in the fact that the distance retainer is equipped with a protective gas and/or processing gas and/or filler intake line. The protective gas intake line is particularly advantageous so as to prevent, by these means a re-oxidation of a cleaned metallic surface, as a result of the intake of protective gas, for example. However, protective gas can also be used for other applications, namely, in conjunction with separating, joining, drilling, and transformation by melting the surface. The introduction of process gas can also be used for these aforementioned procedures, whereas the addition of a filler is thought of particularly in conjunction with joining, in which any gaps in welds or soldered joints must be closed with the aid of the filler. In conjunction with this, the laser beam apparatus can be embodied in such a manner that the distance retainer is equipped with a suction removal apparatus. A removal, by suction, of those emissions that occur locally can be undertaken, for example, the removal, by suction, of metallic vapors. In this way, an adverse impact upon the environment, or the operator, is avoided. The emissions that are withdrawn by suction can, at another point, be processed in a harmless manner, for example, by being filtered out. They cannot adversely affect the observation of the processing location.

For safety when working with the hand-guided beam-emitting head, it is of importance that the distance retainer exhibit a sensor that works in a contact-free manner, and/or a sensor that is contact-effective, for the purpose of clearing the laser apparatus. Thus, the laser apparatus cannot go into action before the beam-emitting head was not moved into the distance position that was pre-determined for it. In the process, the sensor that works in a contact-free manner will be used only if the free distance is very slight, or, it can be assured by other means that the hands of the operating person cannot find their way into the area of the laser beam device's beam. With the contact-effective sensor, especially in the case of a distance retainer that covers the laser beam laterally practically in its entirety, a closed space is achieved, from which no laser radiation can escape unless desired.

In order to assure the desired function of the laser beam apparatus, the latter is so embodied that the distance retainer has a thermally sensitive sensor to turn off the laser apparatus in the event that the surface of the work piece undergoes thermal overload, and/or it is connected to a spectrograph for on-line analysis of emissions that emanate from the work piece. The thermal sensor is, for example, a pyrodetector. It avoids a thermal overloading of the surface of the work piece that is to be processed by turning off the laser apparatus, at least temporarily. With the aid of the on-line analysis of the emissions emanating from the work piece, for example, in conjunction with the removal of coatings from the work piece, or undesired layers from the work piece, it is possible to achieve a determination of the end of the required treatment period in that, for example, for the layer to be removed, characteristic components are no longer determined.

An extension of the beam apparatus can occur by virtue of the fact that the beam deflection apparatus is equipped with at least one movable mirror and/or with a rotation mirror with a helical screw surface. With the aid of the oscillating mirror or the rotation mirror, which exhibits a helical screw surface, e.g. in accordance with the German patent document DE 39 39 577 C2, the laser beam is scanned or guided across a rather large distance, and the surface of the work piece that is affected by it is processed. For example, scale that is present there is removed. The scanning speed must be selected in such a way that the requisite energy density is assured in order to assure the requisite input of energy for processing.

When two movable mirrors or deflection units are used, a circular removal of material is also conceivable, similar to that of an oscillating sander. That affords the advantage that the pathway has no stationary points in which the interaction time resulting from the changing direction of an oscillating mirror is increased in an undesired way. The surface of the work piece can be structured by means of two oscillating mirrors. The structuring can be rendered precise by the use of an increment transmitter, even if only one solitary mirror is used.

If it is to be avoided that in the course of the processing of a surface a greater removal occur at the stationary points of the pathway of an oscillating mirror, the laser beam apparatus can be embodied in such a way that the angular velocity of the movable mirror is measurable on-line, and, on that basis, the operational parameters of the laser apparatus are controllable to such a degree that every point on the surface of the work piece is struck with the same density of energy. The angular velocity of the galvanometer mirror can be measured on-line, or it can be calculated from the mechanical and electrical properties. A correction of the operating parameters of the laser beam apparatus in keeping with the angular velocity is undertaken so that the same energy per unit of time is deposited at every point of the processed surface.

Due to the masses of the moved system, the measurement, or rather calculation of angular velocity may be used to no more than a limited degree. It can therefore be advantageous to embody the laser beam apparatus in such a way that the distance retainer is equipped, on the side facing the work piece, with at least one ray trap, which protrudes into the area of the stationary points of the laser beam pathway. The critical stationary area of the beam is shielded by means of the ray trap. The entry of excessive amounts of energy because of reduced scanning velocity, and thus, undesired damage to the material being processed, does not occur.

When using a ray trap, the laser beam apparatus can be embodied in such a way that the ray trap is cooled, and/or may be positioned oblique to the laser beam, and/or, such that it emits a signal when it is struck by the laser beam, and/or, that it changes the cross-sections of the gas currents. The cooling of a ray trap, which is made, for example, of anodized sheet aluminum, avoids doing damage to the ray trap. Shifting the position of a ray trap, which pre-supposes interchangeability, permits adaptation to various widths, so that by means of the same distance retainer, various processing widths can be achieved. Ray traps can be embodied so as to emit a signal when they are irradiated with the laser beam so as to inform the control device of the laser apparatus regarding the actual width of beam in each case. Clearly coded contacts, by means of which the laser beam is scanned, can be used. The signals of the contacts facilitate the control, or rather, the adjustment of the scanning width. With the aid of the ray trap, or rather, the ability to shift its position, the cross-sections of gas currents can be altered in such a manner that they reduces the cross-section of the opening of the outflow and/or protective gas intake according to the width to be processed, and causes the control device to provide a correspondingly diminished suction withdrawal output or input of protective gas.

In the case of a further embodiment of the laser beam apparatus, provision is made so that the beam-emitting head is equipped with focusing optics that depict the focus of the laser beam on a curved or plane surface of the work piece. This configuration is particularly significant for those laser beam apparatuses that have a laser beam that can be slewed, and in which precise positioning of the laser beam's focus relative to the surface of the work piece is crucial. These so-called flat field optics assure that the focus of the deflected beam proceeds in a flat plane, independent of its slewing, for example, in the flat plane of a surface of the work piece to be processed. Thus, it is assured that the intensity of the laser radiation is present across the entire processing area throughout the flat work piece to the same degree. If curved geometries are to be processed, e.g. pipes, it is possible to embody the focusing optics in such a way that the focus of the laser beam is depicted, at all times, on a surface that is likewise curved. In such a case, it is understood that the distance retainer that is used is correspondingly curved.

An extension of the laser beam apparatus is embodied by virtue of the fact that the beam-emitting head is equipped, at least, with the optical component of an image processing system that observes the processing area, which is equipped, if necessary, with a seam-tracing apparatus that works upon the beam deflection apparatus. The optical component of such an image processing system consists, for example, of a CCD line, by means of which the processing area of the work piece is observed, for example, through the aforementioned open area of the distance retainer. This optical component reports corresponding signals to the image processing system, which can be integrated into the laser apparatus. From here, the processing results are monitored, for example, or structures that are rich in contrasts are reported, such as, for example, the edge of a piece of sheet metal. In the process, the image processing system can be used in conjunction with the seam-tracing apparatus with which the beam-deflection apparatus is controlled. With the latter, the laser beam is so deflected that it works in the desired processing area or area of the seam. Subsequent guidance of the beam-emitting head is not necessary so long as it is assured that the processing area or seam is located within the contact width, of, typically, 5 cm, for example. The seam-tracing apparatus renders it possible to weld metal sheets to one another by hand, or to remove the scale from a seam, without having to follow the seam, in its width, with any degree of precision that exceeds a few centimeters. The seam-tracing apparatus has, for this purpose, the requisite possibility of oscillating mirror control.

The laser beam apparatus can also be embodied so that it is equipped with an auto-focus apparatus for the laser radiation. The auto-focus apparatus can react to any irregularities that might be present in the surface to be processed by panning the focus of the laser beam, for example. To this end, it will have a lens or a mirror, whose position may be shifted, by means of which this panning focus can be accomplished. Such an auto-focus system is also suitable for guiding the focus of the laser beam to follow the melting front.

A further embodiment affecting the aspect of the laser beam device's safety is achieved if the beam-emitting head is embodied with a grip area that compels two-handed operation. Two-handed operation precludes the possibility that the apparatus can be turned on or operated with only one hand. It is not possible to reach into the laser beam unintentionally.

It is advantageous to embody the laser beam apparatus so that the beam-emitting head is connected to the laser apparatus by means of a freely movable light wave line, and it exhibits an adjustment apparatus for the axial and radial positioning of the end of the light wave line, which exhibits one or more fibers. The freely movable light wave line between the beam-emitting head and the laser apparatus improves the operation of the beam-emitting head to a degree that is generally known from line-linked apparatuses. The light wave line can exhibit a considerable length, for example, it can be 100 meters long, which necessitates a correspondingly large space for the operation of the beam-emitting head. The flexibility of the light wave line is so great that the mobility of the beam-emitting head relative to the laser apparatus is practically not limited at all. With the adjustment apparatus, the end of the fiber can be adjusted by the service personnel, or even by the operator, both in the axis of the fiber, as well as perpendicular thereto, thus in three unconnected directions.

If, in the case of such a light wave line, it is necessary to transmit very high peak impulse power outputs, for example, for cleaning stone, a single photo-conductor can be put at risk. In order not to have to preclude such applications, however, the laser beam can be divided and transported through several fibers, subsequently to be united to a single laser beam in the beam-emitting head by way of an additional beam splitter. That renders a correspondingly sensitive, adjustable fiber disconnection for these several fibers necessary.

The invention also relates to a laser beam apparatus for the processing of work pieces with a processing head that emits the laser beam, that exhibits focusing optics, and with a control device that influences the operation of a laser apparatus, depending upon the operational parameters.

The control device must be provided with the requisite operational parameters, with which the laser processing of the work piece must be undertaken. All processing procedures require the more or less precise adjustment of the operational parameters of the laser apparatus, such as mean power output, form and duration of impulse, distribution of output density, frequency of impulse sequence, polarization state, position of focus, etc., as well as the processing parameters, namely the rate at which the laser beam advances and the rate at which it is deflected, protective and processing gas parameters, etc. These can be imparted to the user of the laser beam apparatus, but he must adjust them himself. On the other hand, the laser beam apparatus, at least its beam-emitting head, however, should be used in a hand-guided manner. The mobility that results therefrom is intended for flexible working on-site, where, in addition, the types of use and the configurations of the work pieces can be particularly manifold. Especially in the case of such a mobile laser beam apparatus, the danger is thus particularly great that the adjustment could be undertaken in a flawed manner. That is particularly true with respect to the fact that the laser beam apparatus is to be placed at the disposal of a broad stratum of users whose training to use such apparatuses might not entail any qualifications of a particularly high degree.

It is the underlying task of the invention, therefore, to improve upon a laser beam apparatus having the aforementioned characteristics to such a degree that the user need know as little as possible about the process, or the source of the laser beam, or rather, the laser apparatus; he need only know what material he wants to work on, and how he intends to work on it.

This task is achieved by virtue of the fact that the apparatus is equipped with an interchangeable data medium that exhibits the operational parameters and/or the processing parameters as a means of control.

For this embodiment, it is thus crucial that the operational parameters be input by means of interchangeable data media in which the user employs prepared data media that were made available to him for pre-determined areas of use of the laser beam apparatus. In the process, the laser beam apparatus is embodied in such a way that the data medium is an exclusive means of control that must, absolutely, be present, in order to be able to operate the apparatus at all. With a data medium of this kind, all laser beam and processing parameters can be adjusted to the process that was selected in each case, for example, separation, joining, drilling, removal, or treatment of the surface. When cleaning the surface of a work piece, the basic material/covering layer combination can be prescribed, as can, for example, the thickness of the covering layer as well, or, when drilling, for example, the diameter of the drilled hole, or, in the case of separation, the width of the gap of the cut.

The interchangeable data medium is, to good effect, a chip board. It takes little space, and a wide array of chip boards, for various applications, can be provided without requiring a great deal of space.

It is advantageous to embody the laser beam apparatus in such a way that the use of protective gas and/or processing gas and/or the application of fillers may be controlled using the interchangeable data medium. The extra effort expended in conjunction with the creation of the data medium is slight compared with the risk of flawed processing that is run in the case of adjustment by hand.

On the other hand, it must be assured that the user of the laser beam apparatus can react in a sufficiently individual manner to various work pieces and work piece processing procedures. To this end, the laser beam apparatus is embodied in such a manner that it has, in addition to the interchangeable data medium, individually regulable adjustment components for special, work piece-dependent operational variables. Such operational variables can be, for example, a thickness of a covering layer, or a degree of soiling. The adjustment components are, for example, knobs that can turn, by means of which free programming is possible. The adaptation to the data medium should be such that it is possible to achieve an operation that is as simple as possible, one that renders it possible for the layman to use the apparatus. For example, the operational variables that may be set by the knobs that turn are rendered visible via LCD displays, such that the display, preferably, is controlled by way of the data medium.

An additional possibility of achieving a user-friendly embodiment of the laser beam apparatus is given by virtue of the fact that it is equipped with a bar code reader, with which the use of the appropriate, interchangeable data medium may be governed, and/or the selection of the special, work piece-dependent operational variables may be undertaken in conjunction with a work piece to be processed that is equipped with a bar code. Work pieces that are pre-destined for processing, that are equipped with a bar code, can be scanned with a bar code reader, and the code information transferred by these means to the control device of the laser beam device, leads to an activation of data that have been input previously. With these data, for example, it is possible to determine whether a data medium that has been pre-destined for a pre-determined work piece has been inserted into the laser beam apparatus. Special work piece-dependent operational variables can be input into the data medium or into the control device, and be displayed with the aid of the bar code, or be directly activated, to avoid an adjustment that would have to be undertaken on the basis of this display. Thus, the work piece is used for the purpose of activating a pre-adjustment of the laser beam apparatus. Such an embodiment of the laser beam apparatus facilitates its application, particularly in the case of work pieces, the nature of which changes frequently, which might, in addition, have to undergo processing using various procedures.

The laser beam unit can be embodied in such a manner that the predetermined pathway of the laser beam is a line of adjustable width, or a circle of adjustable diameter, or an ellipse of adjustable semi-axes. Using lines, circles, and ellipses, adjustments to the geometry of the work pieces can be accomplished in each case, and the results of removal can be optimized. The requisite adjustments of the exit opening of distance retainer to the aforementioned pathway forms is free of problems.

The invention also relates to a process for the removal of surface layers from work pieces with a processing head that emits a laser beam, which head exhibits focusing optics and a beam-deflection apparatus, which is guided freehand. Such a process is known from the German patent document DE-C-29 43 107. A system with an oscillating mirror is used to cover flat surfaces quickly. No indications regarding the distance of the processing head from the work piece, or focusing are given.

By contrast, the aforementioned process is to be embodied so that the laser beam is oscillated during freehand guidance by beam deflection with a focus that lies on the surface of the work piece. The oscillation of the laser beam with a focus lying on the surface of the work piece permits working on large areas with a small beam spot so that high intensity values are brought to bear in conjunction with great mean power outputs, and a good removal result is achieved.

The invention relates, furthermore, to a process for the removal of surface layers from work pieces by means of a processing head that emits a laser beam, said head exhibiting focusing optics and a beam-deflection apparatus, which is connected to a laser apparatus that produces laser radiation so as to admit light, especially for use in conjunction with laser beam apparatuses.

Such a process is generally known and used, particularly for cleaning stone surfaces. The laser output that is applied in the process is within the range of a few Watts. If, in the process, cleaning is to be accomplished with high intensities, the laser apparatus must work on impulse operation, such that the time between impulses must be comparatively great. As a result, only very low rates of surface coverage occur.

It is, therefore, the underlying task of the invention to improve upon a process having the aforementioned processing steps in such a manner that covering layers of metals, namely layers of scale, can be removed with more acceptable rates of surface coverage.

This task is accomplished by virtue of the fact that it is accomplished with an intensity of about $10^6$ to $10^7$ W/cm for the purpose of removing scale from non-rusting steel that has a scale layer, as a result of hot rolling, with an energy density of about 100 J/cm$^2$, a scale layer of about 3 to 15 $\mu$m is undertaken, whereby an introduction of protective gas, directed at the irradiated zone of the surface of the work piece occurs.

Due to the effects of intensive laser radiation, within fractions of a second, the vaporization of materials of any sort can be achieved. In the case of metallic materials, material removal occurs, for example, by way of vaporization, without any molten spewing. In the process, the covering layer must be heated in excess of the vaporization temperature. To this end, the energy needed for vaporization must be definitely higher than in the case of a melting process with subsequent spewing of the melt. The depth of removal can be controlled far more precisely in the case of pure vaporization, however, so that it is possible to remove only a covering layer without appreciably altering the surface of the basic material, even if the thickness of the covering layer amounts to no more than a few $\mu$m. If the covering layer is completely removed, the result can be, as it is, for example, in the de-scaling of non-rusting steels, the melting of the basic material down to a depth of a few $\mu$m. This effect is entirely desirable in the case of scale removal, due to the fact that it leads to an improvement of the corrosion properties. The depth of the surrounding molten zone can be controlled by means of the interaction time of the laser radiation.

The removal of the covering layer by vaporization can occur by means of pulsed or continual laser radiation. Its intensity, I, and the energy density, H, must be attuned to the material properties of the covering layer and the basic material, independent of each other. The required intensity, I, results from the requisite surface temperature, namely that temperature that is necessary for vaporization, and it is adjusted by means of the laser output and the area of the beam. The energy density, H, determines the removal per impulse, or per pass, and the effect of the heat on the basic material. It can be calculated from the impulse energy, or from the intensity of the laser radiation, which is integrated by way of the duration of impulse if work proceeds by the impulse method, or, in the case of continual processing, it results from the intensity and the interaction time of the laser radiation. If the energy density does not suffice, in the case of a single pass over the covering layer, or in the case of an impulse per surface area, to remove the covering layer completely, it must be processed several times. In doing so, it must be borne in mind that the absorption and reflective properties of the covering layer depend upon its thickness. Due to the fact that this thickness changes in the course of removal, the absorptive and reflective properties can change as well. In the case of a metallic base material, absorption decreases as a rule, and reflection increases. If the covering layer absorbs the laser radiation of the selected wavelength readily, but the underlying base material, by contrast, does not absorb it so readily, this can be exploited for a self-limiting removal process. At the beginning of the process, a major portion of the laser irradiation that is introduced is absorbed and it leads to vaporization of the covering layer. If the latter is removed, the laser radiation strikes the base material and is, in large measure, reflected, so that no damage of the base material occurs. If the wavelength of the laser radiation that is used does not lend itself to the performance of a self-limiting removal process, a process control can be used to avoid affecting the base material. That is possible, for example, by means of plasma emission spectroscopy, in which an on-line analysis of the vaporizing elements is undertaken.

It has now been possible to achieve the removal of scale from hot rolled, non-rusting steel through the use of the aforementioned processing steps, such that at the same time, re-oxidation of material that has been freed of the covering layer or scale, is prevented.

The removal of scale layers measuring up to 15 $\mu$m from hot-rolled, non-rusting X5CrNi 1810, or X6CrNiMoTi 1722, with $CO_2$ laser radiation, in which the aforementioned processing steps are precisely determined as follows, is cited as an example:

Intensity or output density: $1\times10^6$ W/cm$^2$

Energy density: 100 J/cm$^2$

Mean output: 750 W

Interaction time: 50 $\mu$s at a rate of advance of about 300 m/min, a beam radius of 150 $\mu$m, and a track shift of 125 $\mu$m per pass. A rate of coverage of 3.6 cm$^2$/sec results.

At higher power outputs and increased rates of advance, it is possible to achieve correspondingly higher rates of coverage of area.

Protection from re-oxidation is accomplished by means of a round jet made of copper tubing having an internal diameter of 4 mm, by means of which the protective gas is led to the processing site. The protective gas helium is introduced at a rate of flow of 5–20 l per minute, at a working distance of 13 mm, in an angle of 60° to the perpendicular. The input is undertaken oblique to the direction of advance, so that removed particles cannot be deposited onto the processed area.

Given the parameters indicated, the corrosion properties of the treated surface definitely improve. It was possible to show that by virtue of the potential for localized corrosion to form. The localized corrosive potential, in mV, is all the greater, the more resistant the material is to corrosion. It is apparent that the levels of localized corrosive potential among all samples subjected to treatment by laser beams surpass the localized corrosive potential of the sanded samples in nearly all areas. The critical localized corrosive potential is determined in a 0.5% NaCl solution at a temperature of 30°. It is therefore clear that the laser beam treatment, when compared with what has been, thus far, the most advantageous process, sanding, has advantages in scale-removal. That is attributed to the fact that because of the slight melting of the base material of the substance to be de-scaled, the surface is rendered less sensitive. However, no elimination of granular damage occurs in the case of sanding. Such an elimination of granular damage due to laser radiation is therefore a peculiarity of scale removal by laser radiation that has not been utilized thus far in the case of the aforementioned processing steps and parameters.

It is of considerable economic significance that in the case of scale removal, nitrogen is used as the protective gas. Nitrogen is considerably less expensive than other, comparable inert gases, so that the entire de-scaling process can be rendered correspondingly more cost-effective.

BRIEF DESCRIPTION OF THE DRAWINGS

The invention is elucidated by virtue of an embodiment example that is shown in the drawing.

DESCRIPTION OF THE PREFERRED EMBODIMENTS

The entire laser beam apparatus for processing work pieces that is the subject of the discussion consists of a laser apparatus that is not shown, which exhibits a laser that produces the laser radiation, and of a laser beam-emitting head, 11, with which a laser beam, 12, is directed toward a work piece, not depicted. A light wave line, 13, that consists, for example, of a single, photo-conductive fiber, serves to transmit the laser radiation from the laser apparatus to the beam-emitting head, 11. When transmitting very high laser beam intensities, however, the photo-conductive fiber can become overloaded because the destructive threshold of the fiber material is exceeded. It is then necessary to use several photo-conductive fibers, which is not a problem, in principle. By means of a suitable beam splitter, the laser radiation can be divided among several photo-conductive fibers so that the destructive threshold is not exceeded in any of the fibers. At the end of the lightwave conductor, 13, namely in the area of the beam-emitting head, 11, then, a beam splitter that is not depicted is present, which works inversely, which combines the individual beams that originate from the several photo-conductive fibers to the laser beam, 12. This embodiment is not depicted, neither is an adjustment apparatus with which the end of the light wave line 13 is positioned axially or radially.

Focusing optics, 10, are present in housing 24 of the beam-emitting head, 11. Furthermore, a collimator lens, 25, is present, which renders the laser radiation that originates from lightwave line 13 parallel and conducts it to a deviating prism, 26, whence the radiation proceeds to a mirror, 22. The mirror, 22 guides the radiation to the lenses of focusing optics 10, which are depicted as being arranged on the emitting side, by means of which, focus F is imparted to laser beam 12.

The mirror, 22, may be moved in a slewing motion around an axis of slew, 22'. The propulsion of mirror 22 is accomplished, for example, by means of an oscillator that is housed within a hand grip, 28. As a result of the oscillating motion of the mirror, 22, the laser beam, 12, is moved in the directions of the double arrow, 29, so that the focus, F of laser beam 12, completes a corresponding slewing motion that is directed around the axis of slew, 22'. Only if the work piece is embodied in a correspondingly concave manner does the focus lie, at all times, precisely on the surface of the work piece. As a rule, however, work pieces having flat planes are to be processed. Consequently, it is advantageous to embody the focusing optics, 10, as plane field optics, through which the focusing is altered depending upon the angle of slew. It is possible, for example, to cause the focus to be embodied in such a manner that the pathway described by it is rectilinear, so that work pieces having a flat plane can be processed with optimal concentration of energy into the covering layer to be removed. If necessary, the focusing optics, 10, can also be embodied in such a way that the focus F runs along a convex pathway, seen from the beam-emitting head, 11, which is advantageous for the processing of the external surfaces of pipes.

The precise positioning of the focus F that has been described previously is particularly important if work must proceed using high mean power outputs in order to be able to remove covering layers with very high intensities of radiation, and indeed, to do so with acceptable rates of surface coverage, or rather, with acceptable processing times. The precise positioning of focus F then works in the sense that a laser diode-pumped Nd-YAG laser system, for example, can be used. In the case of such a system, one can build the laser head much smaller if high-output laser diode arrays are used. The degree of the laser apparatus' effectiveness is substantially higher than that of customary lamp-pumped systems, which leads to a decrease in the size of the cooler and the portion of the grid. In addition, this generally renders connection to a 220-Volt socket that is protected by a 16-Ampere fuse possible, so that three-phase current having a higher degree of fuse protection can be dispensed with. The lifespan of the diodes can surpass that of the lamps by a factor of many fold, and thus extend the service intervals of the apparatus. Oil coolers may be used in a secondary circuit in order to reduce the cross-sections of the cooling lines of customary water coolers. In addition, an oil-cooled portion of the grid can be decreased considerably in terms of its structural size, because the thermal loads are decreased as a result of improved cooling. It is possible to reduce the size of a 150-Watt laser system with a Q switch, cooling system, power grid portion, electronics, and suction to such a degree that the entire laser beam apparatus can be pulled behind the user using one hand.

To the extent that the positioning of the focus F need not be precise to the degree described above, for example, when removing a covering layer from a work piece, if the covering layer can be removed using just slight energy density, the guidance of the beam-emitting head, 11, can be undertaken by hand. The size of the beam spot, or its depiction, then permit a sufficient statement to be made regarding the correct distance of the beam-emitting head from the work piece. If, however, work is to proceed quickly, or if some covering layers, or some other procedures are to be undertaken, such as joining, customarily, precise adherence to the distance of the beam-emitting head, 11, from the surface of the work piece is essential. Therefore, provision is made for a distance retainer, 14, which is depicted in FIGS. 3 through 5, for example.

Figure 3:
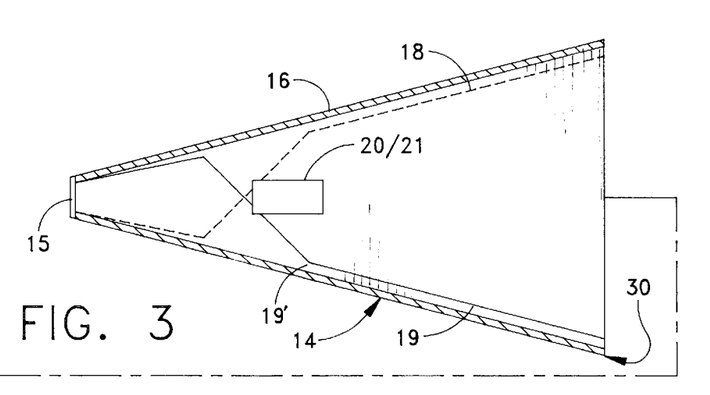
FIG. 3 shows a schematic sectional representation of a distance retainer of the beam-emitting head of FIGS. 1, 2.

The distance retainer 14 of FIG. 3 has, in practical terms, a hollow structure in the form of a truncated cone, with a thin wall, 16. With its end, 30, which is turned toward the beam-emitting head 11, it can be attached to an attachment flange of housing 24, for example, with a bayonet closure and/or with attachment screws. The end of the distance retainer, 14, that faces the work piece is placed upon the work piece in such a manner that a precise spacing of the beam-emitting head, 11, from the work piece, is assured. The distance retainer, 14, is more or less adjusted to the form of the work piece. The pointed end of distance retainer 14, with a means of sealing, 15, in the form of a ring-shaped rubber lip of an applied piece of teflon, or an applied piece made of fiber-reinforced teflon, results from FIGS. 3, 5. With the aid of this means of sealing, 15, and as a result of the structure of the distance retainer, 14, which surrounds and covers laser beam 12 completely, the processing position of the work piece and the space to the beam-emitting head is completely screened off. The point of the distance retainer 14 is rendered oblique in the area of exit opening 33, in order to achieve a better, pulling guidance on the work piece.

Figure 4:
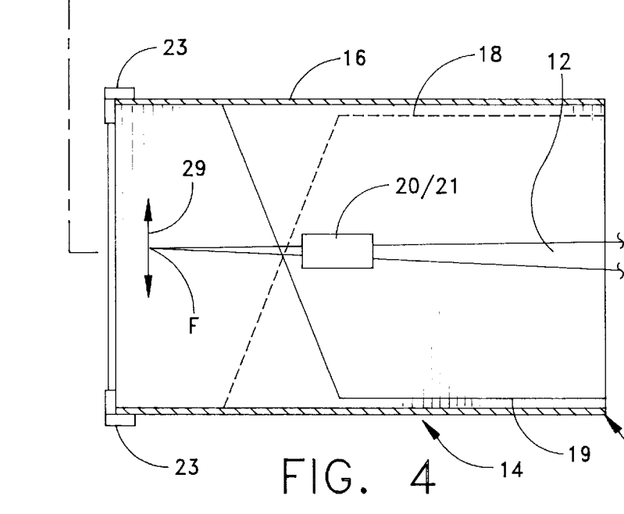
FIG. 4 shows a schematic sectional representation of an additional distance retainer.

FIG. 4 shows a deviating configuration of the space retainer 14, which is equipped, once again, with a connectible end, 30. It can, however, have a housing that is regularly cylindrical in cross-section, with a correspondingly large circular exit opening, 33, for the laser beam, 12. The laser beam 12 can describe a correspondingly circular pathway within the distance retainer, 14, to the extent that the beam-emitting head, 11 is equipped, in a manner not depicted, with two oscillating mirrors, 22, which cause the circular deflection of the beam, 12, or, with an acusto-optical modulator. If only one oscillating mirror is present, the corresponding transverse deflections are not present, and the laser beam is merely moved back and forth, in the plane of depiction of FIG. 4, that is, linear scanning occurs. In this case, the housing of distance retainer 14 can be embodied, from the end, 30, toward exit opening, 33, in the form of a wedge that has been flattened on two sides that are opposite one another. The result, then, is a cross-section according to FIG. 5, with a linear, or rather, rectangular exit opening, 33.

Figure 5:
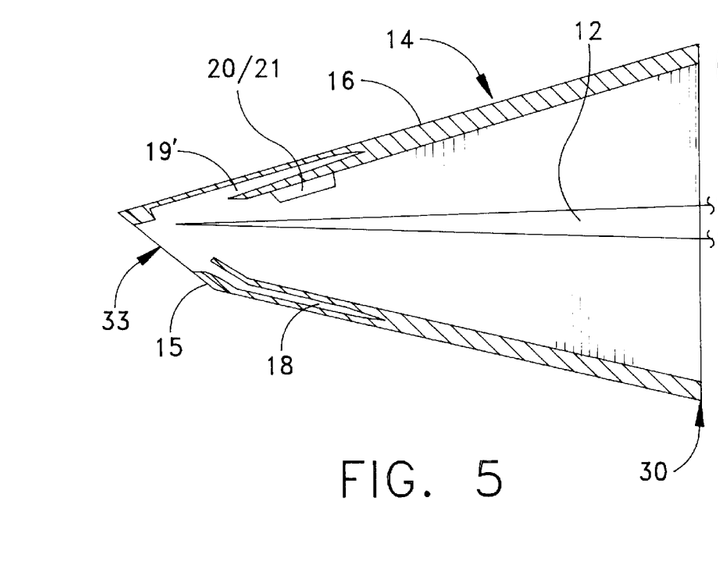
FIG. 5 shows a sectional representation that can be determining for both the distance retainer of FIG. 3 as well as the distance retainer of FIG. 4.

FIG. 5 shows, in the instance of a laser beam that moves back and forth, two beam delimiters or ray traps, 23, which are arranged so as to lie opposite one another and cover the stationary area of laser beam 12, so that the laser beam cannot reach the work piece. It is avoided that the slow laser beam sojourn too long on the work piece and thus input an unusual amount of energy, which could lead to an undesired deep melting of the base material that extends beyond the removal of the covering layer. The energy that works upon the ray trap can, if necessary, be cooled away.

In all embodiments of the distance retainer, 14, it is possible to provide inlet lines, 18, that serve to admit the protective gas, the processing gas, or the filler. FIG. 3 shows an inlet line, 18, that can be supplied, at the end, 30, of distance retainer 14, from a corresponding inlet line, 18', of distance retainer 14. That facilitates the use of various distance retainers, due to the fact that the connection of the inlet lines, 18, 18,' occurs automatically when the distance retainer, 14, is connected to the beam-emitting head. On the side facing the work piece, inlet line 18 debouches in the vicinity of exit opening 33 of distance retainer 14 so that the medium that is admitted is transferred to the processing point of the work piece with the corresponding degree of precision.

It is also possible to operate the laser apparatus with a suction apparatus. FIG. 3 shows nothing more than the outlet line, 19, of such a suction apparatus, the end of which, 19' is provided at some distance from the processing point of the work piece, 10, or the exit opening, 33, so that primarily only the undesired emissions are drawn off, but not the protective or processing gas.

The distance retainers, 14, must be adapted to various processing tasks. It is not only necessary to adapt them to the guidance of different beams, they must also lend themselves well to the processing of corners, edges, round geometrical configurations, etc. In addition, various processes, e.g., those with or without the addition of additional filler material, the components of an image processing system that observes the processing area, or an auto-focusing system, can give rise to various embodiments of distance retainers, 14. In all instances, however, it is not necessary to alter the laser equipment in other respects, that is, in the area of the laser apparatus or the beam-emitting head, 11. Due to distance retainers, 14 that are embodied in various ways, therefore, the laser device can be equipped for a wide array of purposes and uses. Laser devices that have been capable of being used for such a wide array of purposes have not been known heretofore.

In the process, the laser device can be embodied in a relatively simple manner with respect to the monitoring of the process and the safety aspects. For example, distance retainer, 14, is equipped with a sensor, 20, for the purpose of monitoring the manner in which distance retainer 14 lies atop the work piece, in a manner that works free of contact. This sensor, 20, contains, for example, a light signal from a laser diode that is not depicted, only if the sealing agents, 15, lie atop the surface of the work piece, because only then is the light that is emitted by the laser diode reflected onto the sensor, 20, and the latter is enabled to clear the laser apparatus. Sensor 20 functions in a contact-free manner. However, it is also possible to cause the clearing of the laser apparatus by means of a sensor that requires a mechanical contact with the work piece.

The sensor described above functions in a process-monitoring manner. It is not possible to strike the work piece with laser radiation if the distance retainer 14 does not yet lie upon the work piece. The distance retainer 14 can be equipped with additional means of sensing, for example, with a sensitive sensor, 21, that shuts off the laser apparatus if the surface of the work piece is overloaded. Such a thermal overload is expressed by corresponding photo-emission, which can be determined, for example, by means of a correspondingly sensitive sensor, 21.

Figure 1:
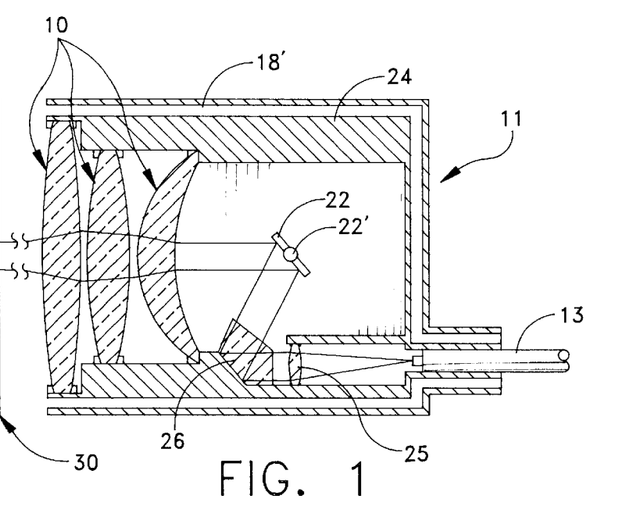
FIG. 1 shows a longitudinal section through a beam-emitting head of the laser beam apparatus, oblique to the slewing axis of an oscillating mirror.
Figure 2:
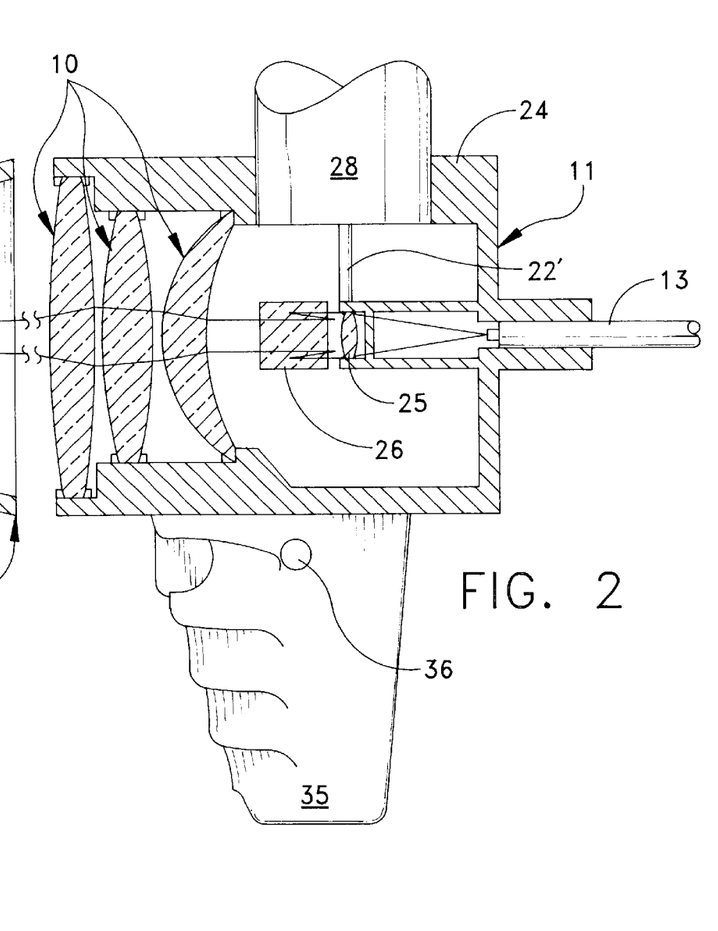
FIG. 2 shows a longitudinal section, turned 90° relative to FIG. 1, in the plane of the axis of the oscillating mirror.

The previously described sensor, 20, is suitable, not only to monitor the processing procedure, but its non-clearance of the laser apparatus also has the underlying reason that the undesired turning on of the laser apparatus, and thus, endangering the operator or other persons, is avoided. Safety in the operation of the laser device can be improved even further in that, for example, two-handed operation is provided for. Only if the operator grips the beam-emitting head, 11, with two hands and operates the two activation elements simultaneously in the process, is the laser apparatus cleared. FIG. 2 shows a hand grip, 35, with such an operating element, 36. A corresponding embodiment can be found on the other side of the beam-emitting head, 11, as well.

What is claimed is:

1. A laser beam apparatus for removing surface layers from workpieces, said apparatus comprising:

a beam emitting head (11) capable of being guided by hand and provided with focusing optics (10), a laser apparatus (13,25,26) for feeding light, to said focusing optics, a beam deflection apparatus (22) disposed in said head (4) and that moves the laser beam (12);

a housing which covers the laser beam (12) and releases said laser beam through an exit opening (33) toward the workpiece, and a distance retainer (14) that renders the distance of the beam emitting head (11) from the workpiece adjustable, characterized by the fact that the distance retainer (14) is a portion of the laser beam apparatus which covers the laser beam (12) and which may be supported on the workpiece so as to seal it off, that the laser beam (12) is capable of being oscillated by the beam deflection apparatus (22) on a predetermined pathway by means of (an outlet) an exit opening of the distance retainer (14), and the focusing optics (10) can alter the focus of the laser beam (12), depending upon the deflection of the beam, with a focus that lies on the surface of the workpiece.

2. A laser apparatus according to claim 1, characterized by the fact that the distance retainer (14) is attached to the beam-emitting head (11) so as to be interchangeable, with other distance retainers.

3. A laser beam apparatus according to claim 1, characterized by the fact that the distance retainer (14) exhibits, on a side facing the work piece, sealing means (15) for sealing space between the work piece and the beam-emitting head and exhibits means for friction reduction.

4. A laser beam apparatus according to claim 1, characterized by the fact that the distance retainer (14) works in conjunction with an increment transmitter, which is connected to a control device of the laser apparatus for the purpose of controlling operating parameters, as well as for the purpose of controlling laser output per unit of area.

5. A laser beam apparatus according to claim 1, characterized by the fact that the distance retainer (14) is embodied such that it may be adjusted longitudinally and in various cross-sectional configurations.

6. A laser beam apparatus according to claim 1, characterized by the fact that the exit opening (33) for the laser beam (12), is adapted to the shape of the spot of its beam, or the shape of its cross-section, and having an additional open area for observing the surface of the work piece.

7. A laser beam apparatus according to claim 1, characterized by the fact that the distance retainer (14) has a hollow structure with a thin wall (16) that is in (the) a shape selected from a group of shapes consisting of a truncated cone, pyramidal, or regularly cylindrical, which is adapted to stand free of engagement with the laser beam (12), which is movable relative to the distance retainer (14).

8. A laser beam apparatus according to claim 1, characterized by the fact that the distance retainer (14) is adapted, on a side facing the workpiece to a contour of the workpiece with a point that is oblique in the area of the exit opening (33).

9. A laser beam apparatus according to claim 1, characterized by the fact that the distance retainer (14) is equipped with a protective gas input line (18).

10. A laser beam apparatus according to claim 1, characterized by the fact that the distance retainer (14) is provided with a sensor (20) that functions a selected one of free of contact and contact active, for clearing the laser apparatus.

11. A laser beam apparatus according to claim 1, characterized by the fact that the distance retainer (14) has a thermally sensitive sensor (21) to turn off the laser apparatus in cases of thermal overload of the surface of the workpiece.

12. A laser beam apparatus according to claim 1, characterized by the fact that the beam deflection apparatus is provided with a movable mirror (22).

13. A laser beam apparatus according to claim 12, characterized by the fact that an angular velocity of the movable mirror (22) is measurable on-line and, on that basis, operational parameters of the laser apparatus are controllable in such a manner that every point of the surface of the work piece is struck with the same energy density.

14. A laser beam apparatus according to claim 1, characterized by the fact that a pathway of the laser beam (12) is a selected one of a line of adjustable width, and a circle of adjustable diameter, and an ellipse of adjustable axes.

15. A laser beam apparatus according to claim 1, wherein said distance retainer is provided with a thermally sensitive sensor connected to a spectrograph for on-line analysis of emissions originating from the workpiece.

16. A laser beam apparatus according to claim 1, characterized by the fact that the focusing optics (10) direct the focus of the laser beam (12) on either of a curved and plane surface of the workpiece.

17. A laser beam apparatus according to claim 1, characterized by the fact that the beam-emitting head (11) is fitted with an optical component of an image processing system that observes a processing area, said optical component being provided with a continuous seam-tracing apparatus that acts upon the beam deflection apparatus.

18. A laser beam apparatus according to claim (15) 1, characterized by the fact that said focusing optics (10) comprise an auto focus apparatus for the laser radiation.

19. A laser beam apparatus according to claim 1, characterized by the fact that the beam-emitting head (11) is provided with a grip area that facilitates two-handed operation.

20. A laser beam apparatus according to claim 1, characterized by the fact that the beam-emitting head (11) is connected to the laser apparatus by a freely movable light wave line (13), and said apparatus is provided with an adjustment apparatus for axial and radial positioning of an end of the light wave line (13), which is provided with at least one fiber.

21. A laser beam apparatus according to claim 1, characterized by the fact that the focusing optics (10) are connected to the beam-emitting head (11) so as to be interchangeable.

22. A laser beam apparatus according to claim 1, characterized by the fact that the distance retainer (14) is equipped with a process gas input line.

23. A laser beam apparatus according to claim 1, characterized by the fact that the distance retainer (14) is equipped with a filler material input line.

24. A laser beam apparatus according to claim 1, characterized by the fact that the distance retainer (14) is provided with a process gas input line which is controllable by a control apparatus provided with an interchangeable data medium.

25. A laser beam apparatus according to claim 1, characterized by the fact that the distance retainer (14) is provided with a filler material input line which is controllable by a control apparatus provided with an interchangeable data medium.

26. A laser beam apparatus according to claim 1, characterized by the fact that the distance retainer (14) is provided, on a side thereof facing the workpiece, with at least one ray trap (23), which extends into an area of laser beam pathway.

27. A laser beam apparatus according to claim 26, characterized by the fact that the ray trap (23) is cooled.

28. A laser beam apparatus according to claim 26, characterized by the fact that the ray trap (23) is adjustable oblique to the laser beam (12).

29. A laser beam apparatus according to claim 26, characterized by the fact that the ray trap (23), when irradiated with the laser beam (12), is operable to emit a signal to alter gas flow cross-sections.

30. A laser beam apparatus for removing surface layers from workpieces, said apparatus comprising:

a beam emitting head (11) capable of being guided by hand and provided with focusing optics (10);

a laser apparatus (13, 25, 26) for feeding light, to said focusing optics;

a beam deflection apparatus (22) disposed in said head (4) and that moves the laser beam (12);

a housing which covers the laser beam (12) and releases the laser beam through an exit opening (33) toward the workpiece;

a distance retainer (14) that renders the distance of the beam emitting head (11) from the workpiece adjustable; and a control apparatus that influences operation of said laser beam apparatus, depending upon operating parameters and processing parameters, characterized by the fact that the distance retainer (14) is a portion of the laser beam apparatus which covers the laser beam (12) and which may be supported on the workpiece so as to seal it off, that the laser beam (12) is capable of being oscillated by the beam deflection apparatus (22) on a predetermined pathway by means of the exit opening of the distance retainer (14), and that the focusing optics (10) can alter the focus of the laser beam (12), depending upon the deflection of the beam, with a focus that lies on the surface of the workpiece; and further characterized by the fact that said laser beam control apparatus is provided with an interchangeable data medium, which medium exhibits the operating parameters and processing parameters.

31. A laser beam apparatus according to claim 30, characterized by the fact that the interchangeable data medium comprises a chip board selected from an array of chip boards interchangeable for various applications.

32. A laser beam apparatus according to claim 30, characterized by the fact that a protective gas input line (18) is controllable by means of the interchangeable data medium.

33. A laser beam apparatus according to claim 30, characterized by the fact that said control apparatus further comprises individually adjustable components for special workpiece dependent operational variables.

34. A laser beam apparatus according to claim 33, characterized by the fact that said laser beam apparatus is provided with a bar code laser, with which use of an appropriate interchangeable data medium is undertaken in a controllable manner, and selection of special workpiece dependent operation variables is made, depending upon a workpiece that is provided with a bar code provided for processing.

35. A process for the removal of surface layers from work pieces with a processing head that has focusing optics and a beam deflection apparatus that emits a laser beam which is guided freehand, wherein the laser beam, while it is being guided freehand, is oscillated by means of beam deflection with a focus that lies on the surface of the work piece.

36. A process for the removal of surface layers from workpieces, the process including the steps of providing a processing head that exhibits focusing optics (10), providing a beam deflection apparatus that emits a laser beam (12), and connecting said processing head to a laser apparatus that produces a laser beam so as to feed in light, characterized by the fact that the process is undertaken for the purpose of de-scaling non-rusting steel that has a layer of scale from hot rolling with an intensity of about $10^6$ to $10^7$ W/cm$^2$, given an energy density of about 100 J/cm$^2$ on the surface of the workpiece and a scale layer 3 to 15 um, in course of which protective gas is directed at an irradiated area of the surface of the work piece.

37. A process according to claim 36, characterized by the fact that nitrogen is used as the protective gas.

* * * * *